United States Patent
Meyers et al.

(10) Patent No.: US 10,288,098 B2
(45) Date of Patent: May 14, 2019

(54) PIN AND GROMMET FASTENER ACCOMMODATING TWO DIRECTIONAL OFFSET AND RELATED METHODS

(71) Applicant: Newfrey LLC, New Britain, CT (US)

(72) Inventors: Jason A. Meyers, Shelby Township, MI (US); Matthew R. Polselli, Macomb Township, MI (US)

(73) Assignee: Newfrey LLC, New Britain, CT (US)

( * ) Notice: Subject to any disclaimer, the term of this patent is extended or adjusted under 35 U.S.C. 154(b) by 183 days.

(21) Appl. No.: 15/344,155

(22) Filed: Nov. 4, 2016

(65) Prior Publication Data

US 2018/0128297 A1    May 10, 2018

(51) Int. Cl.
| | |
|---|---|
| *F16B 5/06* | (2006.01) |
| *F16B 5/12* | (2006.01) |
| *F16B 21/07* | (2006.01) |
| *B60R 13/02* | (2006.01) |

(52) U.S. Cl.
CPC ........ *F16B 5/0657* (2013.01); *B60R 13/0206* (2013.01); *F16B 5/0628* (2013.01); *F16B 5/126* (2013.01); *F16B 21/075* (2013.01); *F16B 5/065* (2013.01)

(58) Field of Classification Search
CPC ...... F16B 5/0628; F16B 5/065; F16B 5/0657; F16B 5/126; F16B 21/075; F16B 21/084; F16B 21/086; F16B 5/06; B60R 13/0206
USPC .......................................... 411/508, 509, 510
See application file for complete search history.

(56) References Cited

U.S. PATENT DOCUMENTS

| | | |
|---|---|---|
| 2,228,176 A | 1/1941 | Miller |
| 4,002,821 A | 1/1977 | Satoh et al. |
| 4,043,579 A | 8/1977 | Meyer |
| 4,407,042 A | 10/1983 | Schramme et al. |
| 4,458,552 A | 7/1984 | Spease et al. |

(Continued)

FOREIGN PATENT DOCUMENTS

| | | |
|---|---|---|
| EP | 0698741 A1 | 2/1996 |
| FR | 2554522 A1 | 5/1985 |

(Continued)

OTHER PUBLICATIONS

Extended European Search Report dated Mar. 13, 2018 in corresponding EP Application No. 17196055.2.

*Primary Examiner* — Roberta S Delisle
(74) *Attorney, Agent, or Firm* — Harness, Dickey & Pierce, PLC (57) ABSTRACT

An inner housing defines a pin retaining receptacle elongated in an X-direction with entry ramps extending parallel to the X-direction. The inner housing is slidably coupled to an outer housing and extends into an interior thereof. A plurality of centering blades extend into the interior and between the inner and outer housings to locate the pin retaining receptacle in a central position within the interior in a Y-direction prior to insertion of the pin into the pin retention receptacle. The centering blades are movable in the Y-direction to permit the pin retaining receptacle of the inner housing to move to a non-central position relative to the housing in the Y-direction as a result of the inner housing moving the centering blades in response to the pin engaging the entry ramps during insertion of the pin into the pin receiving receptacle. Associated methods are also disclosed.

16 Claims, 13 Drawing Sheets

(56) References Cited

U.S. PATENT DOCUMENTS

| | | | |
|---|---|---|---|
| 4,594,040 A | 6/1986 | Molina | |
| 4,626,620 A | 12/1986 | Plyler | |
| 4,707,020 A | 11/1987 | Enokida et al. | |
| 4,729,606 A | 3/1988 | Narita et al. | |
| 4,768,907 A | 9/1988 | Gauron | |
| 4,865,505 A * | 9/1989 | Okada | B60N 3/046 411/512 |
| 4,923,347 A | 5/1990 | Moryl et al. | |
| 4,971,500 A | 11/1990 | Benoit et al. | |
| 5,028,189 A | 7/1991 | Harley | |
| 5,073,070 A | 12/1991 | Chang | |
| 5,098,765 A | 3/1992 | Bien | |
| 5,129,768 A | 7/1992 | Hoyle et al. | |
| 5,387,065 A * | 2/1995 | Sullivan | F16B 19/1081 411/45 |
| 5,429,467 A | 7/1995 | Gugle et al. | |
| 5,484,175 A | 1/1996 | Teich et al. | |
| 5,533,237 A * | 7/1996 | Higgins | F16B 5/065 24/289 |
| 5,536,125 A | 7/1996 | Gaw, Jr. | |
| 5,542,158 A * | 8/1996 | Gronau | F16B 5/065 24/289 |
| 5,606,784 A | 3/1997 | Hamamoto | |
| 5,716,578 A | 2/1998 | Ichikawa et al. | |
| 5,738,476 A | 4/1998 | Assimakopoulos | |
| 5,806,139 A | 9/1998 | Anderson et al. | |
| 5,890,831 A | 4/1999 | Kato | |
| 6,048,147 A * | 4/2000 | Arisaka | F16B 19/1081 411/41 |
| 6,145,173 A | 11/2000 | Suzuki et al. | |
| 6,196,756 B1 | 3/2001 | Leverger | |
| 6,206,604 B1 | 3/2001 | Dembowsky et al. | |
| 6,209,175 B1 | 4/2001 | Gershenson | |
| 6,474,616 B2 * | 11/2002 | Yamada | B60N 2/01508 248/503.1 |
| 6,505,990 B1 | 1/2003 | Maughan | |
| 6,530,714 B2 | 3/2003 | Schwarz | |
| 6,553,615 B1 | 4/2003 | Hansen et al. | |
| 6,560,819 B2 | 5/2003 | Mizuno et al. | |
| 6,695,481 B1 | 2/2004 | Chen | |
| 6,758,622 B2 | 7/2004 | Burton | |
| 7,226,233 B2 | 6/2007 | SuBenbach et al. | |
| 7,470,081 B2 | 12/2008 | Miyahara et al. | |
| 7,740,432 B2 | 6/2010 | Harada | |
| 7,861,384 B2 | 1/2011 | Baumgartner | |
| 7,905,694 B2 | 3/2011 | van Walraven | |
| 8,322,001 B2 | 12/2012 | Ehrhardt et al. | |
| 8,613,414 B2 | 12/2013 | Rosemann et al. | |
| 8,636,454 B2 * | 1/2014 | Okada | F16B 5/0642 24/295 |
| 8,950,043 B2 | 2/2015 | Hofmann et al. | |
| 9,057,393 B1 * | 6/2015 | Lawrence | F16B 5/02 |
| 9,080,588 B2 | 7/2015 | Diez Herrera et al. | |
| 9,140,294 B2 | 9/2015 | Burton | |
| 9,150,120 B2 | 10/2015 | Antoine et al. | |
| 9,303,665 B2 | 4/2016 | Steltz et al. | |
| 9,550,441 B2 * | 1/2017 | Aoyama | B60N 3/023 |
| 9,995,331 B2 | 6/2018 | Heimann et al. | |
| 2008/0056816 A1 | 3/2008 | Sussenbach | |
| 2011/0219588 A1 * | 9/2011 | Inoue | F16B 5/065 24/458 |
| 2012/0131771 A1 | 5/2012 | Hofmann et al. | |
| 2013/0014353 A1 | 1/2013 | Loewe et al. | |
| 2014/0050548 A1 * | 2/2014 | Loewe | F16B 5/0607 411/48 |
| 2014/0053385 A1 | 2/2014 | Nielsen-Cole et al. | |
| 2015/0211565 A1 | 7/2015 | Benedetti | |
| 2015/0321622 A1 * | 11/2015 | Dickinson | B60R 13/0206 24/458 |
| 2016/0138646 A1 | 5/2016 | Elperman et al. | |
| 2016/0258465 A1 | 9/2016 | Heimann et al. | |
| 2018/0050610 A1 | 2/2018 | Hattori et al. | |
| 2018/0209463 A1 | 7/2018 | Glickman et al. | |

FOREIGN PATENT DOCUMENTS

| | | |
|---|---|---|
| FR | 2740183 A1 | 4/1997 |
| JP | 2012087824 A | 5/2012 |
| JP | 2012167692 A | 9/2012 |

\* cited by examiner

PIN AND GROMMET FASTENER ACCOMMODATING TWO DIRECTIONAL OFFSET AND RELATED METHODS

FIELD

The present disclosure relates to pin and grommet fasteners.

BACKGROUND

This section provides background information related to the present disclosure which is not necessarily prior art.

Pin and grommet fasteners are known in the art. Such pin and grommet fasteners typically require the pin to be centrally aligned in both X and Y directions with a pin receiving aperture of the grommet. In other words, a pin that is offset from the pin receiving aperture must be physically repositioned to align with the center of the pin receiving aperture of the grommet before the pin can be inserted into the pin receiving aperture. Some pin and grommet fasteners exist that allow for offset of the pin in one direction (e.g., in the X-direction), but the pin must still be repositioned relative to the grommet so the pin is centrally aligned with the pin receiving aperture in the other direction (e.g., in the Y-direction) to effect its insertion.

Such pin and grommet fasteners are not completely satisfactory, for example, where a plurality of pins are attached to a first component in fixed positions relative to each other and need to be inserted into pin receiving apertures of a corresponding plurality of grommets fixed to another component. As another example, such pin and grommet fasteners are not completely satisfactory where insertion of the pin into the grommet involves blind positioning and insertion of the pin in the grommet. Ease of pin insertion in both of these cases would be facilitated by a pin and grommet fastener that can accommodate a significant amount of pin offset in both the X and Y directions during insertion into the pin retaining aperture of the grommet.

SUMMARY

This section provides a general summary of the disclosure, and is not a comprehensive disclosure of its full scope or all of its features.

In accordance with one aspect of the present disclosure, a pin and grommet fastener for mounting in an aperture of a first component and receiving a pin extending from a second component to couple the first and second components together is provided. The pin and grommet fastener can include a pin having a pin retention groove or protrusion. The grommet can include an inner housing defining a pin retaining receptacle elongated in an X-direction with entry ramps extending parallel to the X-direction, a cooperating pin retention groove or protrusion operable to retain the pin retention groove or protrusion, and an inner housing flange having an inner housing retaining surface. The grommet can also include an outer housing defining an interior with an outer housing flange having a cooperating inner housing retaining surface, and a plurality of resilient retention wings positioned to retain the first component against the outer housing flange when the outer housing is mounted within the aperture of the first component. The grommet can additionally include a plurality of centering blades extending into the interior and between the inner and outer housings and extending to locate the pin retaining receptacle of the inner housing in a central position within the interior of the outer housing in a Y-direction prior to insertion of the pin into the pin retention receptacle. The centering blades are movable in the Y-direction to permit the pin retaining receptacle of the inner housing to move to a non-central position relative to the housing in the Y-direction as a result of the inner housing moving the centering blades during insertion of the pin into the pin receiving receptacle.

In accordance with one aspect of the present disclosure, a method of manufacturing a pin and grommet fastener for mounting in an aperture of a first component and receiving a pin extending from a second component to couple the first and second components together is provided. The method can include molding an inner housing that defines a pin retaining receptacle elongated in an X-direction with entry ramps extending parallel to the X-direction, and a cooperating pin retention groove or protrusion operable to retain the pin retention groove or protrusion, and an inner housing flange having a pair of inner housing retaining surfaces. The method can also include molding two outer housing half-components that together define an interior with an outer housing flange having a pair of cooperating inner housing retaining surfaces, and cooperating locking surfaces coupling the two half-components together, and a plurality of resilient retention wings positioned to retain the first component against the outer housing flange when the outer housing is mounted within the aperture of the first component. The method can additionally include assembling the two outer housing half components together around the inner housing causing the pair of inner housing retaining surfaces to capture the pair of cooperating inner housing retaining surfaces while the cooperating locking surfaces are being positioned and engaged against each other to couple the two half-components and simultaneously couple the inner housing to the outer housing permitting slidable movement in a Y-direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

FIGS. 1-6 illustrate one example embodiment of a pin and grommet fastener 20 in accordance with the present disclosure. The grommet 22 is mountable in an aperture 26 of a first component 28 to receive the pin 24 extending from a second component 30 to couple the first and second components, 28 and 30, respectively, together. The pin 24 can include a retention groove 32. Additionally or alternatively, the pin 24 can include a retention protrusion 34.

The grommet 22 includes an inner housing 36 and an outer housing 38. The inner housing 36 defines a pin retaining receptacle 40 elongated in an X-direction. The pin retaining receptacle 40 can include entry ramps 42 extending parallel to the X-direction. A cooperating pin retention protrusion 46 is positioned to engage the pin retention groove 32 and retain the pin 24 in the pin retention receptacle 40. Alternatively or additionally, a cooperating pin retention groove can be positioned to engage the pin retention protrusion 34 and retain the pin 24 in the pin retention receptacle 40.

The inner housing 36 can include an inner housing flange 48 having an inner housing retaining surface 50. Two inner housing retaining surfaces 50 of this embodiment are provided by respective peripheral portions of slots 52 extending through the flange 48. The outer housing 38 can have an outer housing flange 54 having cooperating inner housing retaining surfaces 56. Two cooperating inner housing retaining surfaces 56 of this embodiment are provided by protrusions 57 extending from flexible posts 58 extending from the outer housing flange 54.

The outer housing 38 can have a plurality of resilient retention wings 60 positioned to retain the first component 28 against the lower surface of the outer housing flange 54 when the outer housing 38 is mounted within the aperture 26 of the first component 28.

The outer housing 38 defines an interior 62 and a plurality of centering blades 64 extend into the interior 62 between the outer housing 38 and the inner housing 36. The centering blades 64 are positioned and extend to locate the pin retaining receptacle 40 in a central position (FIG. 4) within the interior 62 of the outer housing 38 in a Y-direction prior to insertion of the pin 24 into the pin retention receptacle 40. The centering blades 64 can be flexible enough to move in the Y-direction to permit the pin retaining receptacle 40 to move to a non-central position (FIG. 5) relative to the outer housing 38 in the Y-direction as a result of the inner housing 36 flexing and moving the centering blades 64 during insertion of the pin 24 into the pin receiving receptacle 40.

Figure 1:
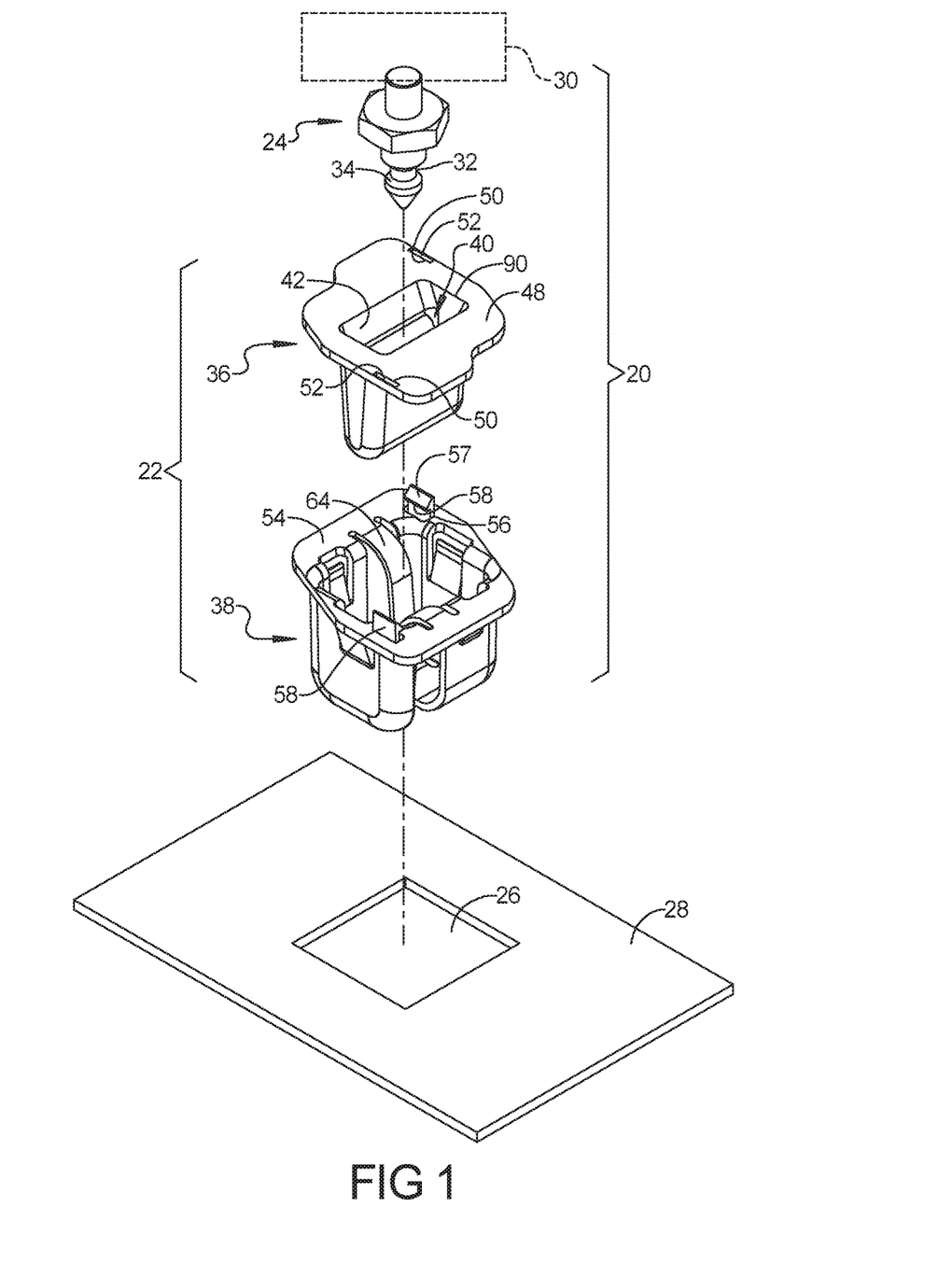
FIG. 1 is an exploded perspective view including a first example embodiment of a pin and grommet fastener in accordance with the present disclosure.
Figure 2:
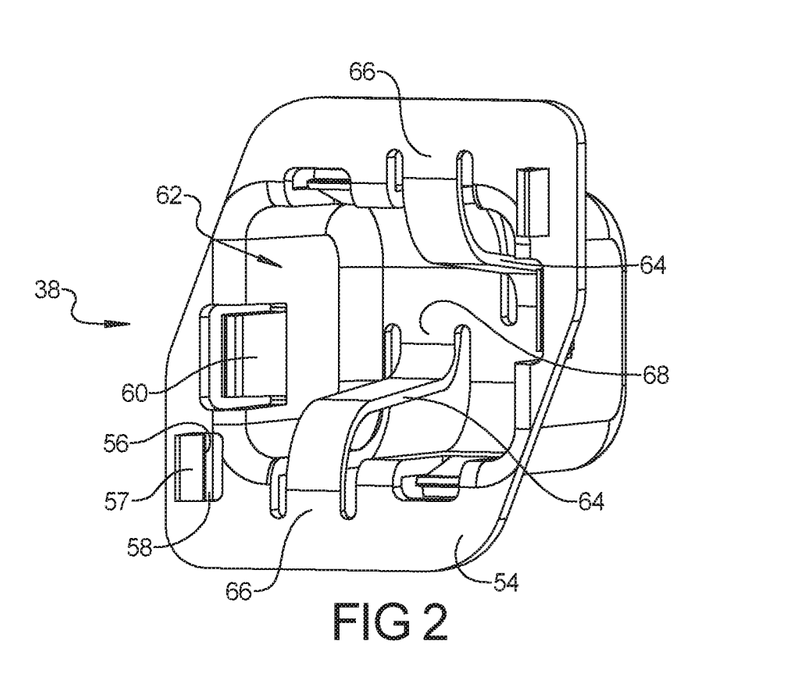
FIG. 2 is a perspective view of the outer housing of the first example pin and grommet fastener of FIG. 1.
Figure 3:
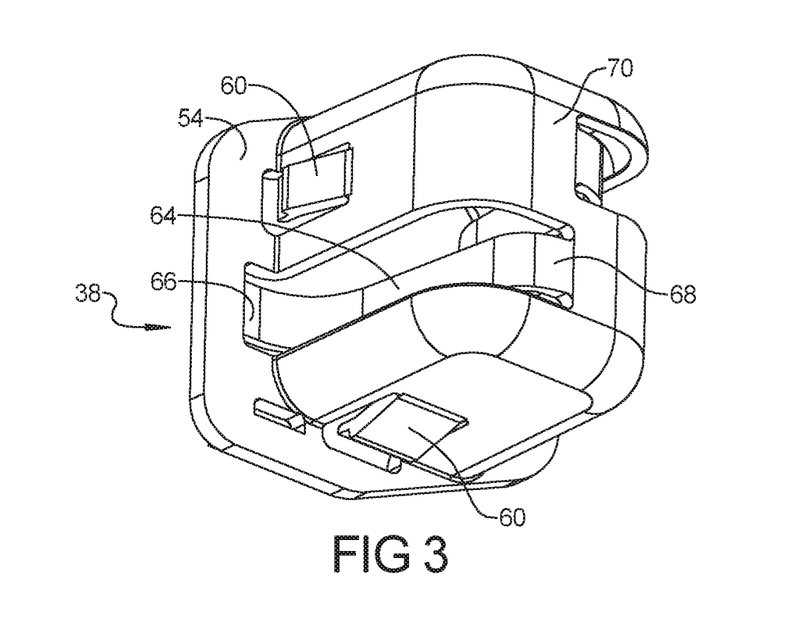
FIG. 3 is another perspective view of the outer housing of the first example pin and grommet fastener of FIG. 1.
Figure 4:
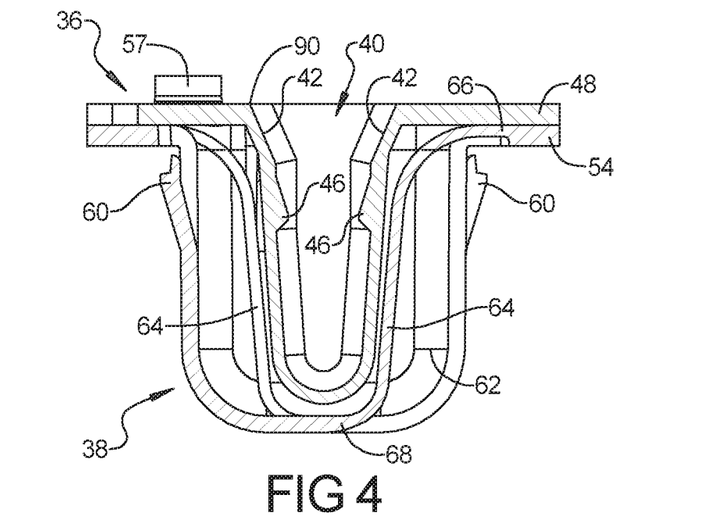
FIG. 4 is a cross-section view of the grommet of the first example pin and grommet fastener of FIG. 1, showing the inner housing in a central position.
Figure 5:
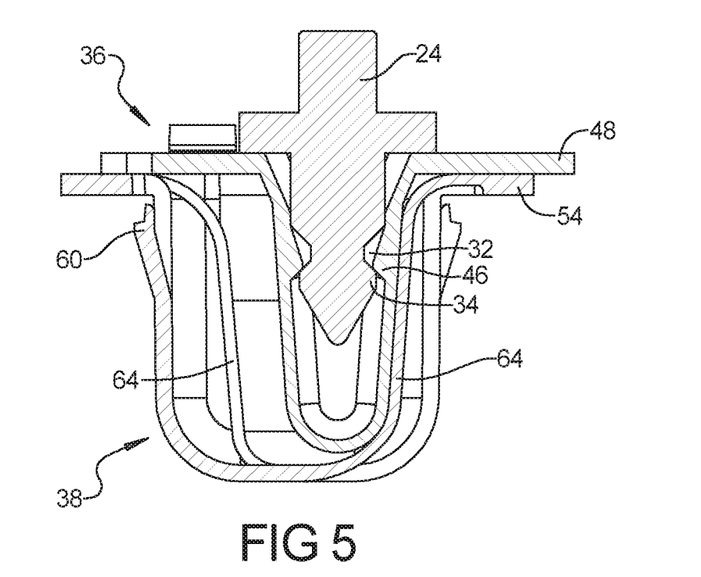
FIG. 5 is a cross-section view of the grommet of the first example pin and grommet fastener of FIG. 1, showing the inner housing in a non-central position.
Figure 6:
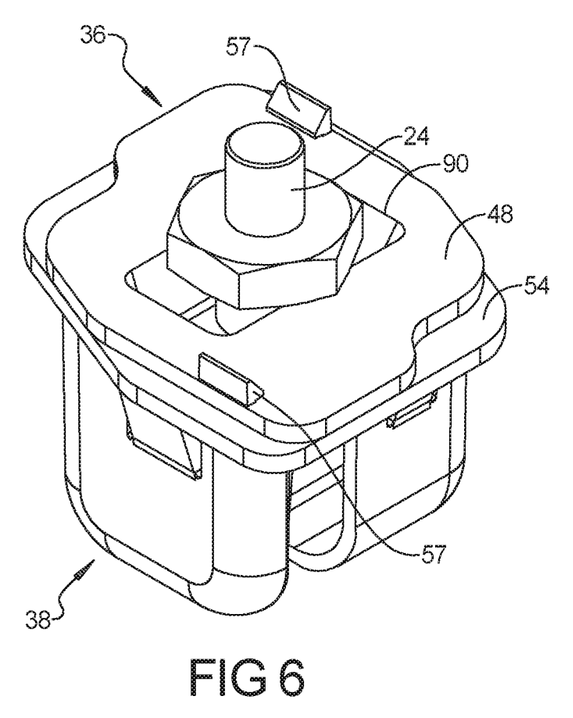
FIG. 6 is a perspective view of the first example pin and grommet fastener of FIG. 1.
Figure 7:
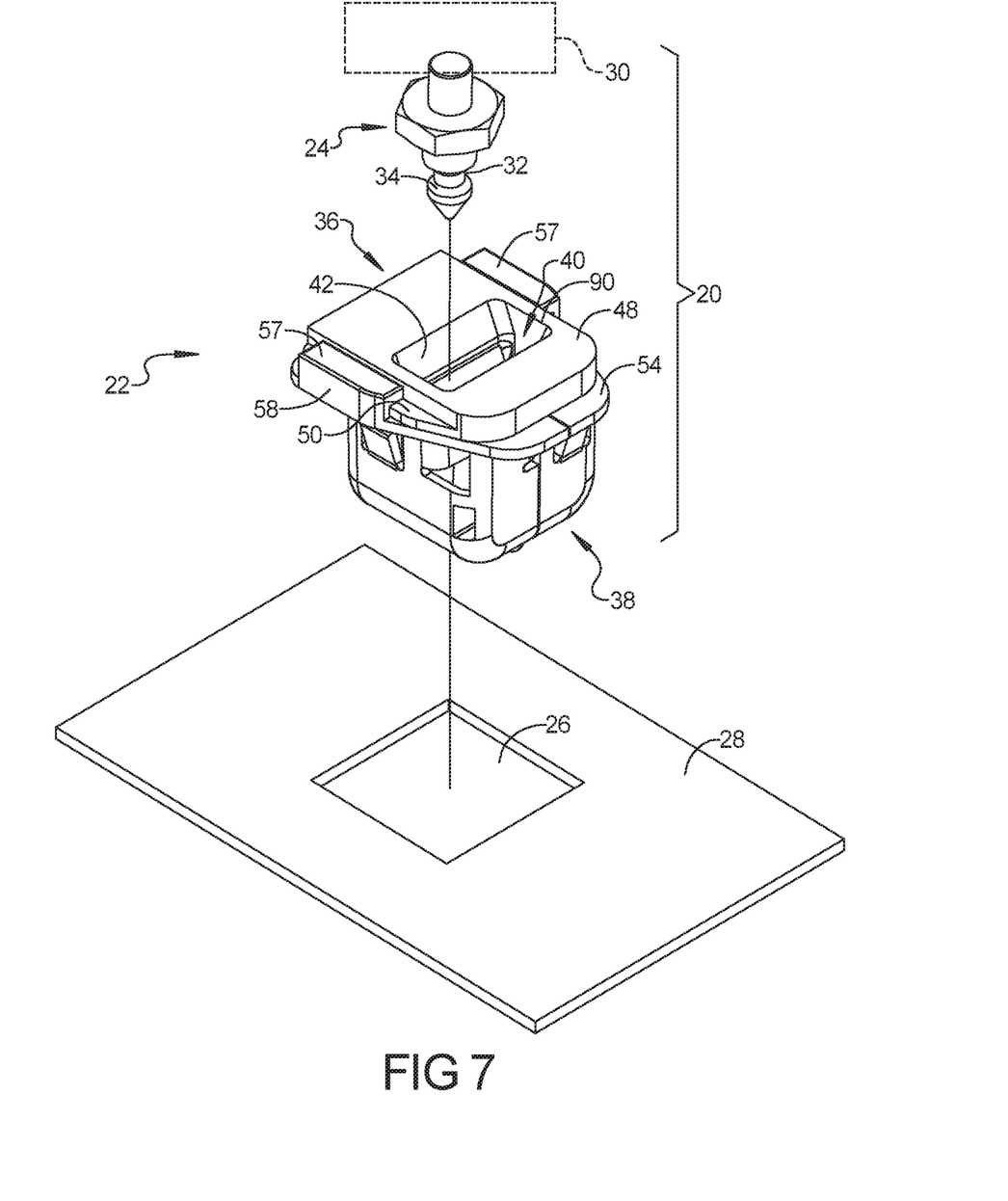
FIG. 7 is a partially exploded perspective view including a second example embodiment of a pin and grommet fastener in accordance with the present disclosure.
Figure 8:
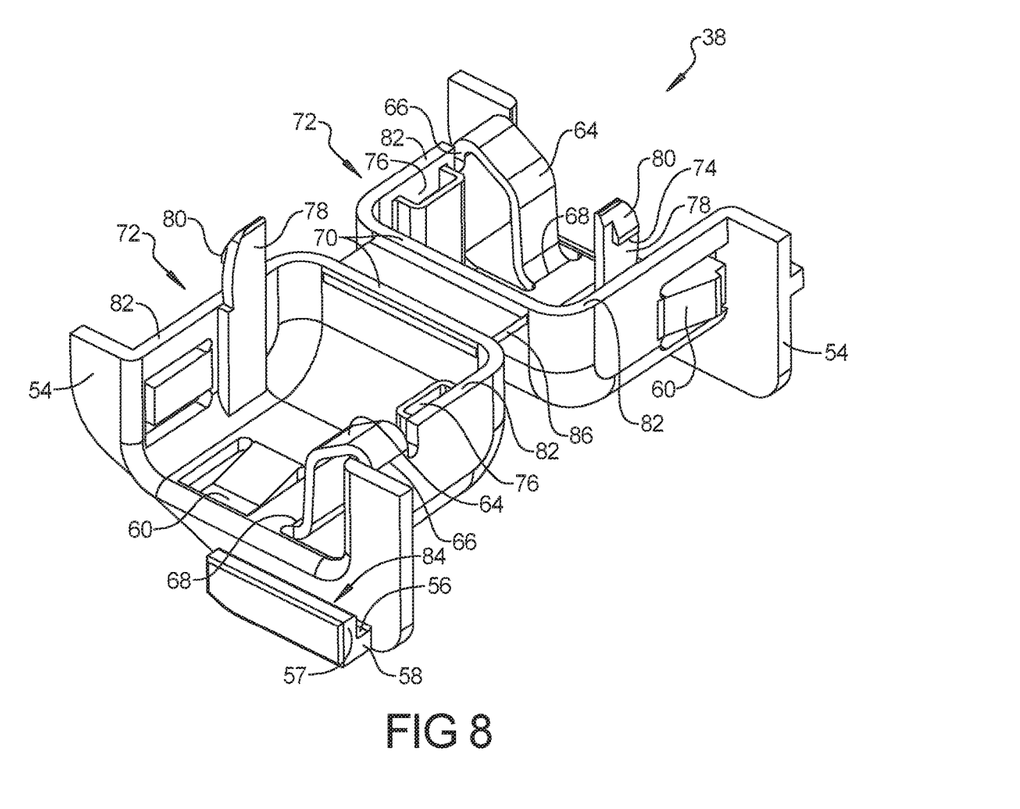
FIG. 8 is a perspective view of the outer housing of the second example pin and grommet fastener of FIG. 7.
Figure 9:
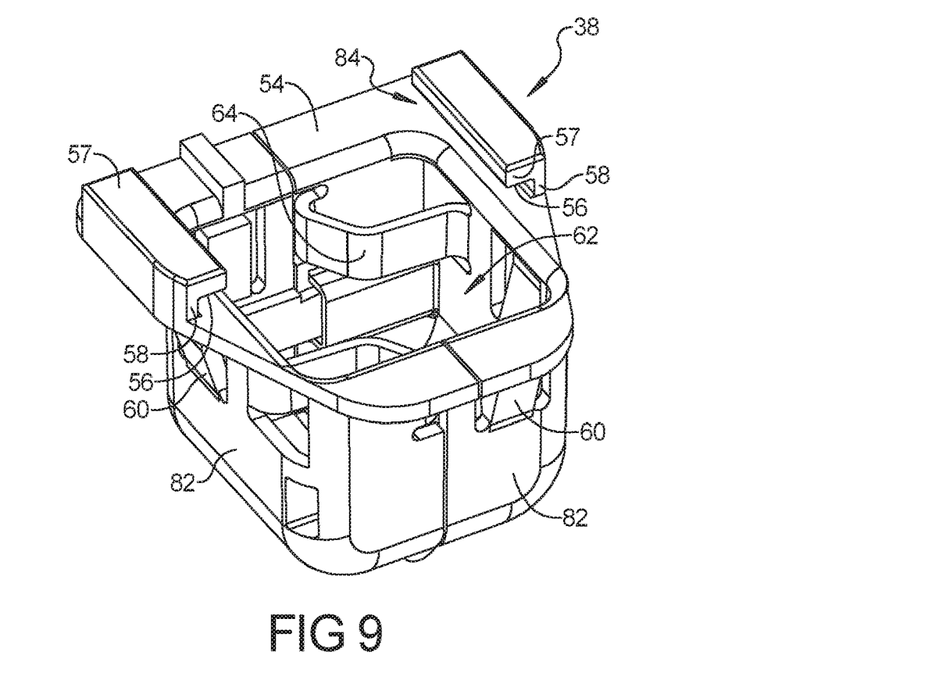
FIG. 9 is another perspective view of the outer housing of the second example pin and grommet fastener of FIG. 7.
Figure 10:
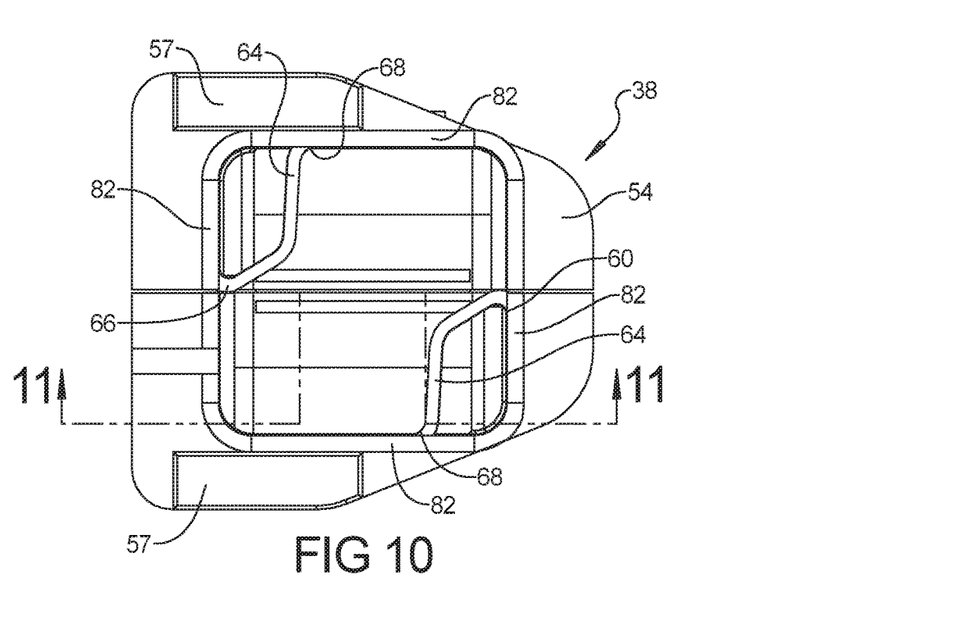
FIG. 10 is a top plan view of the outer housing of the second example pin and grommet fastener of FIG. 7.
Figure 11:
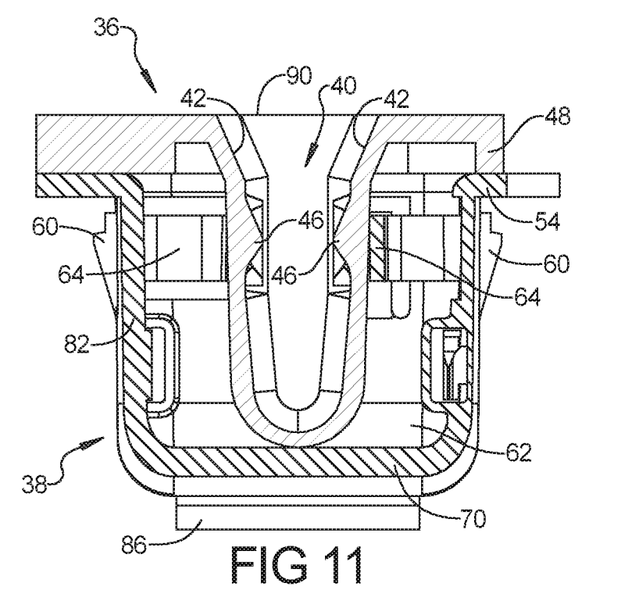
FIG. 11 is a cross-section view of the grommet of the second example pin and grommet fastener of FIG. 7, showing the inner housing in a central position.
Figure 12:
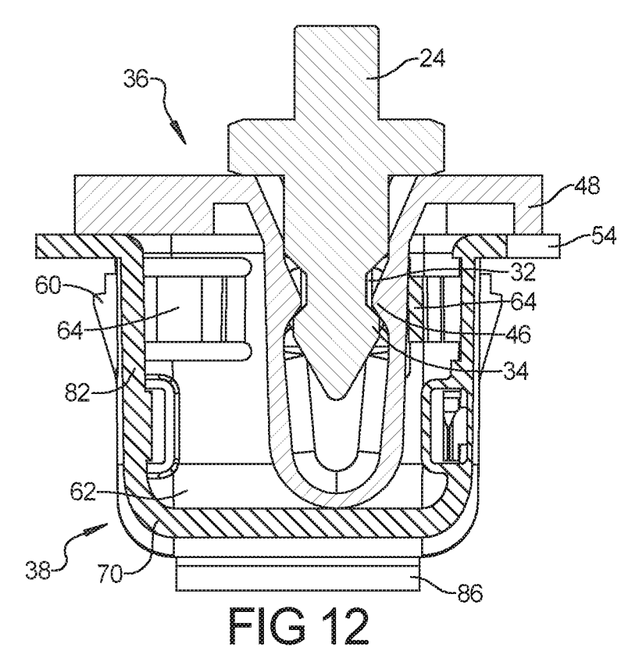
FIG. 12 is a cross-section view of the grommet of the second example pin and grommet fastener of FIG. 7, showing the inner housing in a non-central position.
Figure 13:
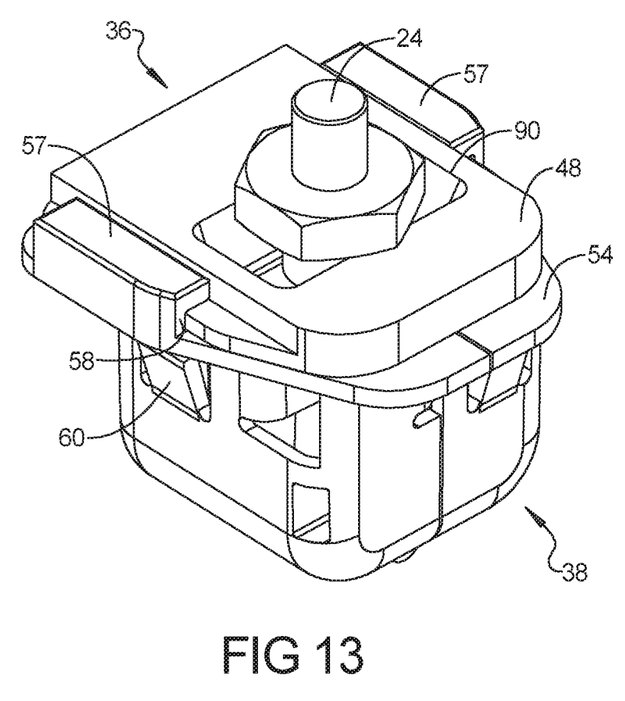
FIG. 13 is a perspective view of the second example pin and grommet fastener of FIG. 7.
Figure 14:
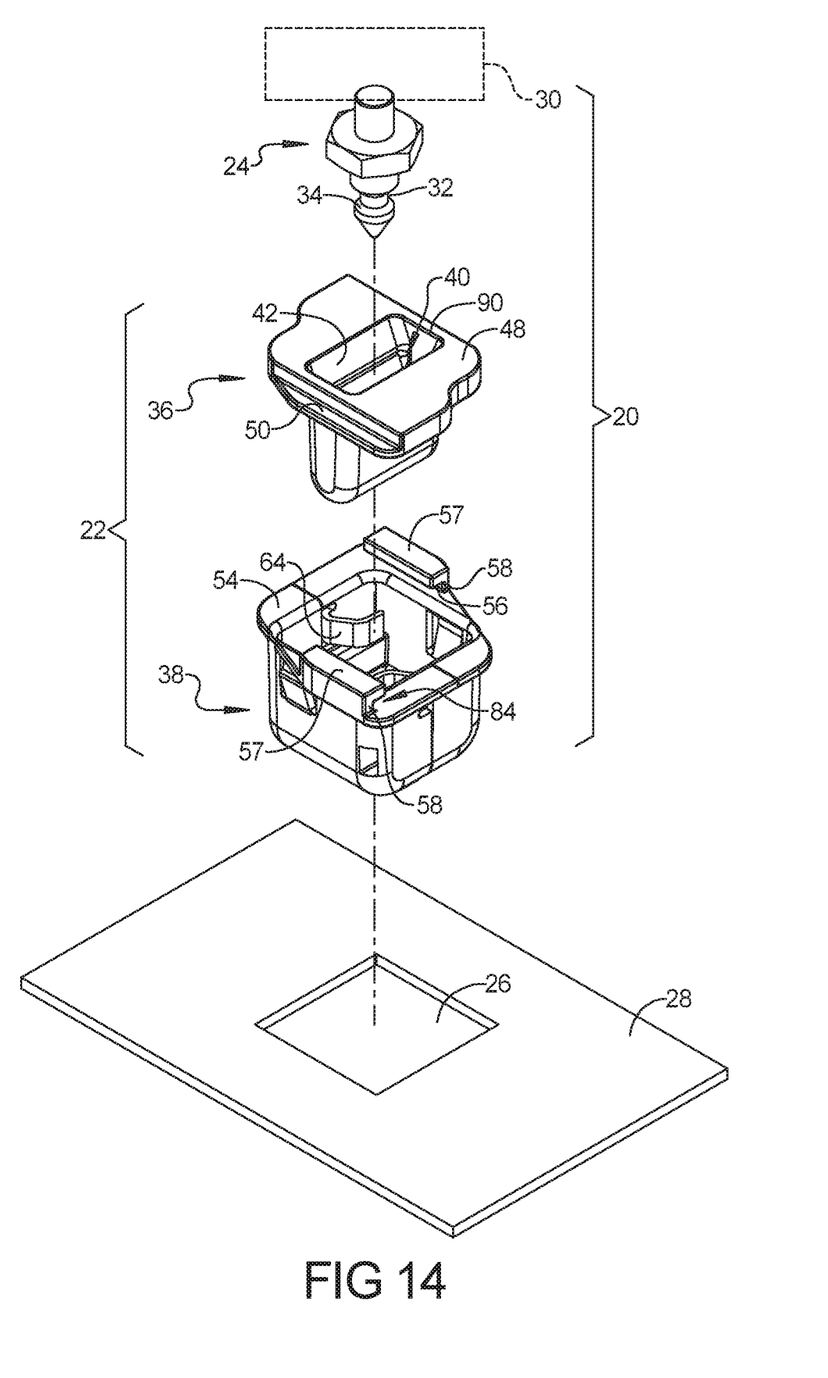
FIG. 14 is a partially exploded perspective view including a third example embodiment of a pin and grommet fastener in accordance with the present disclosure.
Figure 15:
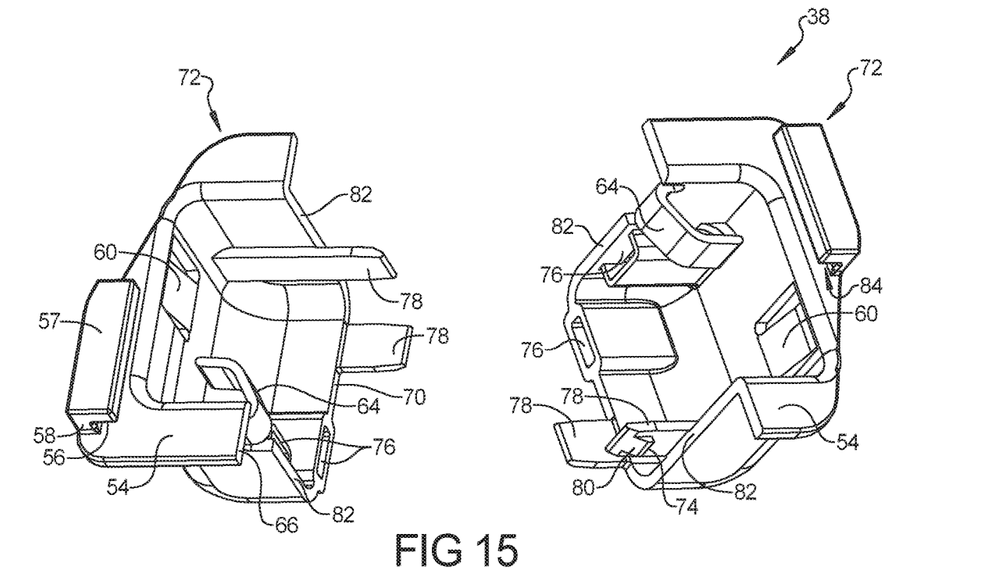
FIG. 15 is an exploded perspective view of the outer housing of the third example pin and grommet fastener of FIG. 14.
Figure 16:
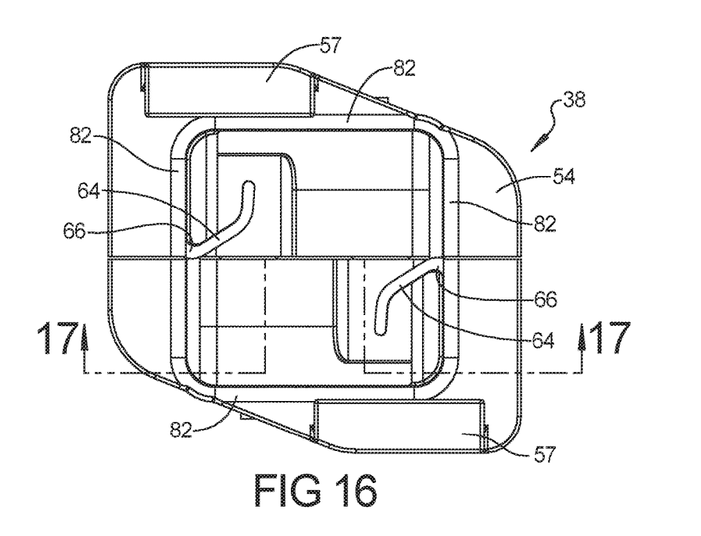
FIG. 16 is a top plan view of the outer housing of the third example pin and grommet fastener of FIG. 14.

As the pin 24 is offset from the pin retaining receptacle 40 in the Y-direction, it engages against one of the angled entry ramps 42. Continued insertion of the offset pin 24 transfers a force to the inner housing 36 via the engaged entry ramp 42. This causes the inner housing 36 to engage against and move the centering blade 64 adjacent to, or on the same side as, the engaged entry ramp 42. Thus, insertion of the offset pin 24 causes the pin retaining receptacle 40 to move to the non-central position (FIG. 5).

A Y-direction dimension of the slots 52 is greater than a Y-direction dimension of the flexible post 58 to permit such sliding movement of the inner housing flange 48 relative to the outer flange 54 in the Y-direction. An X-dimension of the slots 52 is greater than an X-dimension of the flexible post 58 and protrusion 59 providing the cooperating inner housing retaining surface 56.

Each centering blade 64 can have a first end 66 and a second end 68. As in this example embodiment, the first end can be coupled to the outer housing flange 54 and the second end 68 can be coupled to the end wall 70 of the outer housing 38 opposite the outer housing flange 54. As in this example embodiment, the centering blades 64 can extend generally axially within the interior 62 of the outer housing 38 between an upper portion of the outer housing 38 toward the flange 54 and a lower portion of the outer housing 38 toward the end wall 70.

FIGS. 7-13 illustrate another example embodiment of a pin and grommet fastener 20 in accordance with the present disclosure. The features or elements of this embodiment that are common or similar to those of the prior embodiment are not repeated in detail and identical reference numerals are used in these figures to identify such common or similar features. Similarly, some of the discussion below may be likewise applicable to common or similar features of the prior embodiment.

Unlike the prior example embodiment in which the outer housing 38 is a single-piece integral component, the outer housing 38 of this example embodiment comprises two half-components 72 coupled together with a living hinge 86. Cooperating locking surfaces 74, 76 engage and lock against each other to couple the two half-components 72 together. The cooperating locking surfaces 74 can be provided by protrusions 80 extending from extending arms 78. The cooperating locking surfaces 76 can be detents formed in a side wall 82 of the outer housing 38.

Both the first end 66 and the second end 68 of the centering blades 64 can be coupled and extend from adjacent side walls 82 of the outer housing 38. Thus, the centering blades 64 can extend generally laterally within the interior 62 of the outer housing 38 between a right side of the outer housing and a left side of the outer housing 38.

The inner housing retaining surface 50 can be provided by a peripheral portion 52 of an edge of the inner housing flange 48. Each cooperating inner housing retaining surface 56 can be provided by a protrusion 57 extending from a non-flexible post 58. The non-flexible posts 58 and protrusions 57 can provide slots or channels 84 open toward or opposing each other and extending longitudinally in the Y-direction. When the non-flexible posts 88 and protrusions 57 provide the inner housing retaining surface 50 adjacent the cooperating inner housing retaining surface 56, the inner housing 36 and the outer housing 38 are slidably coupled together to permit relative movement therebetween in the Y-direction. During such movement, the inner housing flange 48 and outer housing flange 54 are slidable against each other.

Due to the rigid or non-flexible nature of the post 58 and protrusion 57 and the inner housing 36 extending into the interior 62 of the outer housing 38, the opposite peripheral portions 52 of the inner housing 36 can be captured within the opposing slots 84 as the two half-components 72 are brought together and coupled together.

In this example embodiment, the two half-components 72 can be molded together with a living hinge 86 therebetween. Thus, the two half-components 72 can have a hinged clamshell configuration. For example, the hinge 86 can couple the portions of the end wall 70 together. The pivot axis of the hinge 86 can extend parallel to the longitudinal direction of the opposing slots 84. As the two half-components 72 of the outer housing 38 are pivoted toward each other about the hinge 86 and coupled together via the cooperating locking surfaces 74, 76, the inner housing 36 is positioned so that the opposite peripheral portions 52 of the inner hosing flanges 48 are received and captured in the opposing slots 84 of the flanges 54 of the outer housing 38.

FIGS. 14-19 illustrate yet another example embodiment of a pin and grommet fastener 20 in accordance with the present disclosure. As above, features or elements of this embodiment that are common or similar to those of the prior embodiment are not repeated in detail and identical reference numerals are used in these figures to identify such common or similar features. Similarly, some of the discussion below may be likewise applicable to common or similar features of one or both of the prior embodiments.

As with the immediately prior embodiment, the outer housing 38 of this embodiment is formed of two half-components 72. Rather than a hinge coupling the portions of the end wall 70 together, this example embodiment has additional cooperating locking surfaces 74, 76 to couple the portions of the end wall 70 together.

In this example embodiment, the first end 66 of each centering blade 64 is coupled to a side wall 82 of the outer housing 38, while the second end 68 of each centering blade 64 is an uncoupled free end. Alternatively, the first end 66 of one or both of the centering blades 64 can be coupled to any combination of the end wall 70, the outer housing flange 54, or one of the side walls 82, while the second end 68 remains an uncoupled free end.

Figure 17:
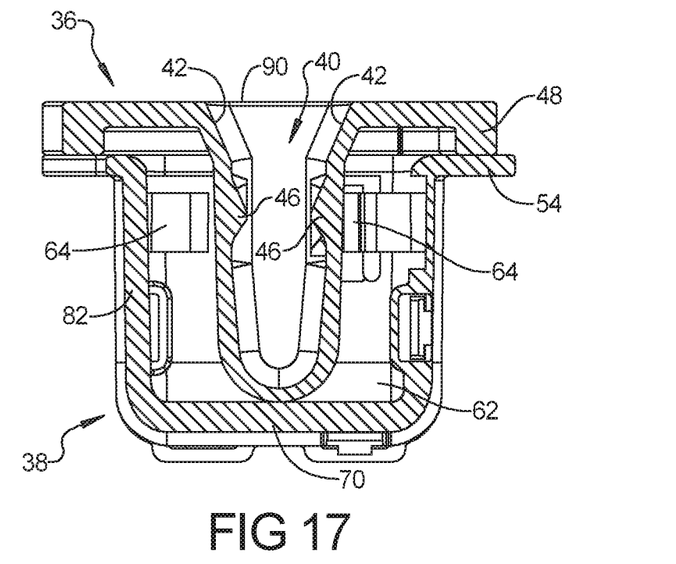
FIG. 17 is a cross section view of the grommet of the third example pin and grommet fastener of FIG. 14, showing the inner housing in a central position.

As with the prior embodiments, the centering blades 64 extend within the interior 62 between the inner housing 36 and outer housing 38 to initially position the pin retention receptacle 40 of the inner housing in a central Y-direction position relative to the interior 62 of the outer housing 38 (FIG. 17).

Initially retaining the pin retention receptacle 40 in this central Y-direction position (FIGS. 4, 11 and 17) provides initial certainty as to where outer opening 90 of the pin retention receptacle 40 is in the Y-direction. This enables reduced overall package size of the grommet 22 and facilitates insertion of the pin 24 into the grommet 22. For example, if the inner housing 36 was initially permitted to float or slide freely relative to the outer housing 38, the inner housing 36 could be initially positioned against a far right side wall 82 of the outer housing 38. Thus, in order to insure capture of a pin 24 inserted at a far left side of the outer opening 90 of the pin retention receptacle 40, this outer opening 90 would need to be much larger in the Y-direction. Because the acceptable angle of the entry ramps 42 is limited, this means the entry ramps 42 would need to be longer resulting in increased overall axial length of the pin retention receptacle 40, and therefore, in increased overall axial length of the grommet 22 and of pin 24.

In contrast, the smaller sized outer opening 90 of the pin retention receptacle 40 is possible when the centering blades 64 position the pin retention receptacle 40 in a central Y-direction position relative to the outer housing 38. For example, in cases where multiple pin and grommet fasters 20 are used to join the first component 28 and the second component 30 together, the tolerances typically involve plus and minus dimensions from an ideal position or location. When in the central position, the outer opening 90 need only be large enough to accommodate the plus/minus tolerance dimensions. Similarly, in cases where a blind coupling of the pin 24 and grommet 22 together occurs, the repeatable relative central positioning of the pin retention receptacle 40 provides a known position of the outer opening 90 that a user or machine can rely upon when inserting the pin 24 into the grommet 22. Of course, the outer opening 90 is always maintained in a central X-direction position with the elongate pin retention receptacle 40 accommodating for tolerances or positional offsets in the X-direction.

Figure 18:
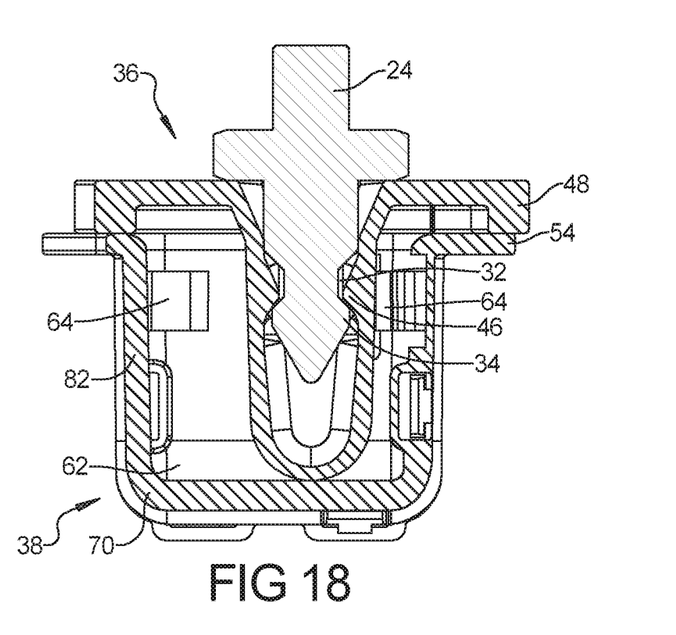
FIG. 18 is a cross section view of the grommet of the third example pin and grommet fastener of FIG. 14, showing the inner housing in a non-central position.
Figure 19:
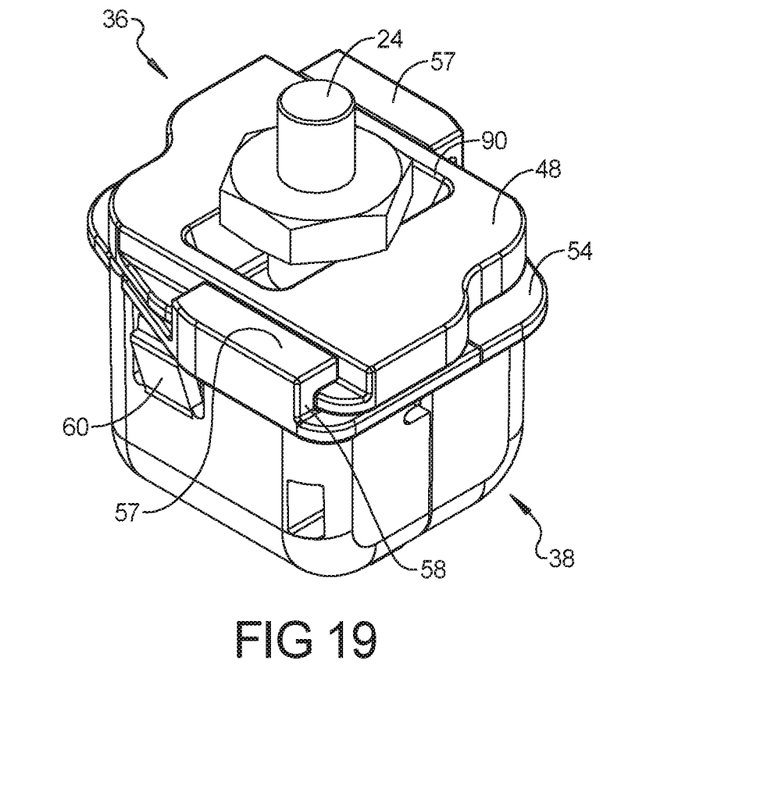
FIG. 19 is a perspective view of the third example pin and grommet fastener of FIG. 14.

Returning to the example embodiment of FIGS. 14-19, the centering blades 64 are frangible. A pin 24 offset in the Y-direction engages against the entry ramps 42 as it is inserted into the pin retention receptacle 40 causing the inner housing to move to the non-central position (FIG. 18) relative to the interior 62 of the outer housing 38. As the inner housing 36 moves to this non-central position, the frangible centering blades 64 move and can ultimately bend or break (FIG. 18). The frangible centering blades 64 can be made of a brittle material, enabling them to break. Additionally or alternatively, the frangible centering blades 64 can have a weakened area enabling them to bend or break.

Associated methods should be apparent from the discussion above. For example, methods of manufacturing the pin and grommet fastener 20 can include molding a pin 24 and grommet 22 having any of the features or elements disclosed above, and assembling them together as described, including inserting the pin into the grommet. Methods of use or assembling first and second components, 28 and 30, respectively, together can include any of inserting the grommet 22 into the aperture 26 of the first component 28 and inserting a pin 24, coupled to the second component 30, into the pin retention receptacle 40. All associated methods can include inserting a pin offset in the X-direction and in the Y-direction into the pin retention receptacle 40 to cause the inner housing 36 to move in the Y-direction relative to the outer housing 38 as discussed above.

Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. Terms such as "first," "second," and other numerical terms when used herein do not imply a sequence or relative importance unless clearly indicated by the context. Similarly, the reference to "half-component(s)" does not require that each half-component represent a half of outer housing. Rather, "half-component" is used herein to convey that the outer housing is formed from two separate major components that are coupled together. Separately, references to the "X-direction" and the "Y-direction" herein relate to a two dimensional coordinate system in a plane aligned with the flanges of the grommet. As used herein, "generally axially" means extending within the interior generally between top to bottom portions of the housing (e.g., generally perpendicular to a plane defined by the outer housing flange), and "generally laterally" means extending within the interior generally between two side portions (e.g., generally parallel to a plane defined by the outer housing flange).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pin and grommet fastener for mounting in an aperture of a first component and receiving a pin extending from a second component to couple the first and second components together comprising:
   a pin including a pin retention groove or protrusion;
   a grommet comprising:
     an inner housing defining a pin retaining receptacle elongated in an X-direction with entry ramps extending parallel to the X-direction, a cooperating pin retention groove or protrusion operable to retain the pin retention groove or protrusion, and an inner housing flange having an inner housing retaining surface;
     an outer housing defining an interior with an outer housing flange having a cooperating inner housing retaining surface, and a plurality of resilient retention wings positioned to retain the first component with the outer housing flange when the outer housing is mounted within the aperture of the first component;
     a plurality of centering blades extending within the interior and between the inner and outer housings and extending to locate the pin retaining receptacle of the inner housing in a central position within the interior of the outer housing in a Y-direction prior to insertion of the pin into the pin retention receptacle, wherein the centering blades are movable in the Y-direction to permit the pin retaining receptacle of the inner housing to move to a non-central position relative to the interior of the outer housing in the Y-direction as a result of the inner housing moving the centering blades during insertion of the pin into the pin receiving receptacle.

2. The pin and grommet fastener of claim 1, wherein the centering blades have first and second ends and each of the first and second ends is coupled to a wall or the flange of the outer housing.

3. The pin and grommet fastener of claim 2, wherein the first and second ends are coupled to adjacent side walls of the outer housing.

4. The pin and grommet fastener of claim 2, wherein the first and second ends are coupled to the outer housing flange and an end wall of the outer housing opposite the outer housing flange.

5. The pin and grommet fastener of claim 1, wherein at least a first end of the centering blades is coupled to a wall or the flange of the outer housing.

6. The pin and grommet fastener of claim 1, wherein the centering blades extend generally axially within the interior of the outer housing between an upper portion of the housing and a lower portion of the housing.

7. The pin and grommet fastener of claim 1, wherein the centering blades extend generally laterally within the interior of the outer housing between a right portion of the housing and a left portion of the housing.

8. The pin and grommet fastener of claim 1, wherein the centering blade is flexible between an initial position corresponding to the central position and a second position corresponding to the non-central position.

9. The pin and grommet fastener of claim 1, wherein the centering blade is frangible between an initial position corresponding to the central position and a second position corresponding to the non-central position.

10. The pin and grommet fastener of claim 1, wherein the outer housing and the inner housing are each a single-piece integral component.

11. The pin and grommet fastener of claim 10, wherein the inner housing retaining surface is provided by a peripheral portion of a slot in the inner housing flange and the cooperating inner housing retaining surface is provided by a protrusion extending from a flexible post.

12. The pin and grommet fastener of claim 1, wherein the outer housing comprises two half-components with cooperating locking surfaces coupling the two half-components together.

13. The pin and grommet fastener of claim 12, wherein the two half components are hingedly coupled together.

14. The pin and grommet fastener of claim 13, wherein the inner housing retaining surface is provided by a peripheral portion of an edge of the inner housing flange and the cooperating inner housing retaining surface is provided by a protrusion extending from a non-flexible post, and wherein the protrusion is positioned to capture the peripheral portion as the two half-components are coupled together during engagement of the cooperating locking surfaces.

15. The pin and grommet fastener of claim 1, wherein the inner housing retaining surface is provided by a peripheral portion of an edge of the inner housing flange and the cooperating inner housing retaining surface is provided by a protrusion extending from a non-flexible post.

16. The pin and grommet fastener of claim 15, wherein the inner housing flange has an upper surface, and wherein the protrusion and the non-flexible post are completely positioned below the upper surface when the inner housing is coupled to the outer housing.

* * * * *